May 16, 1961
N. A. SHAGINAW
2,984,512
AUTOMOBILE IMPACT DEFLECTING BUMPER AND BODY GUARD
Filed Jan. 12, 1956
3 Sheets-Sheet 1
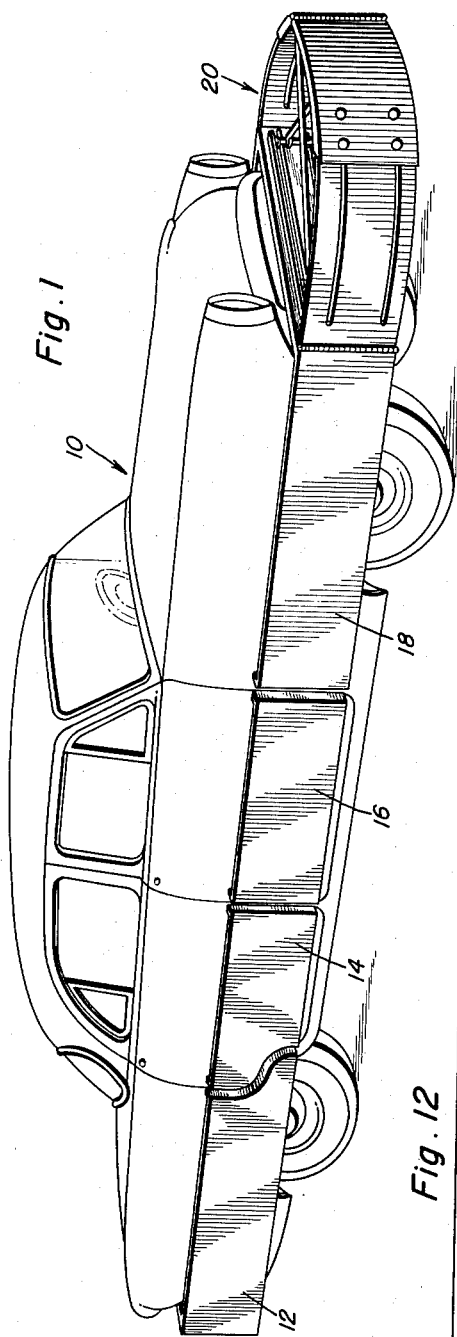
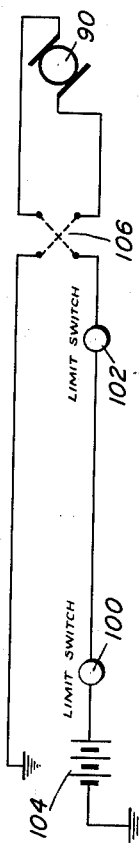
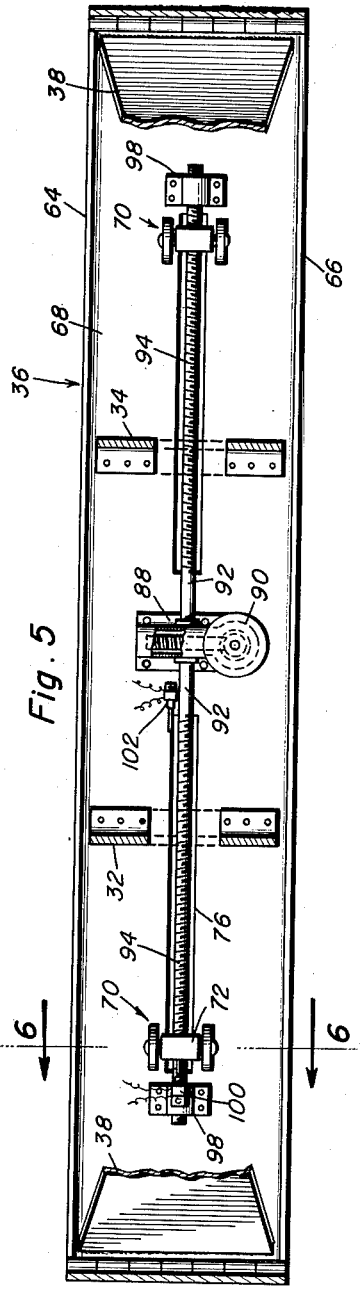
Nicholas A. Shaginaw
INVENTOR.

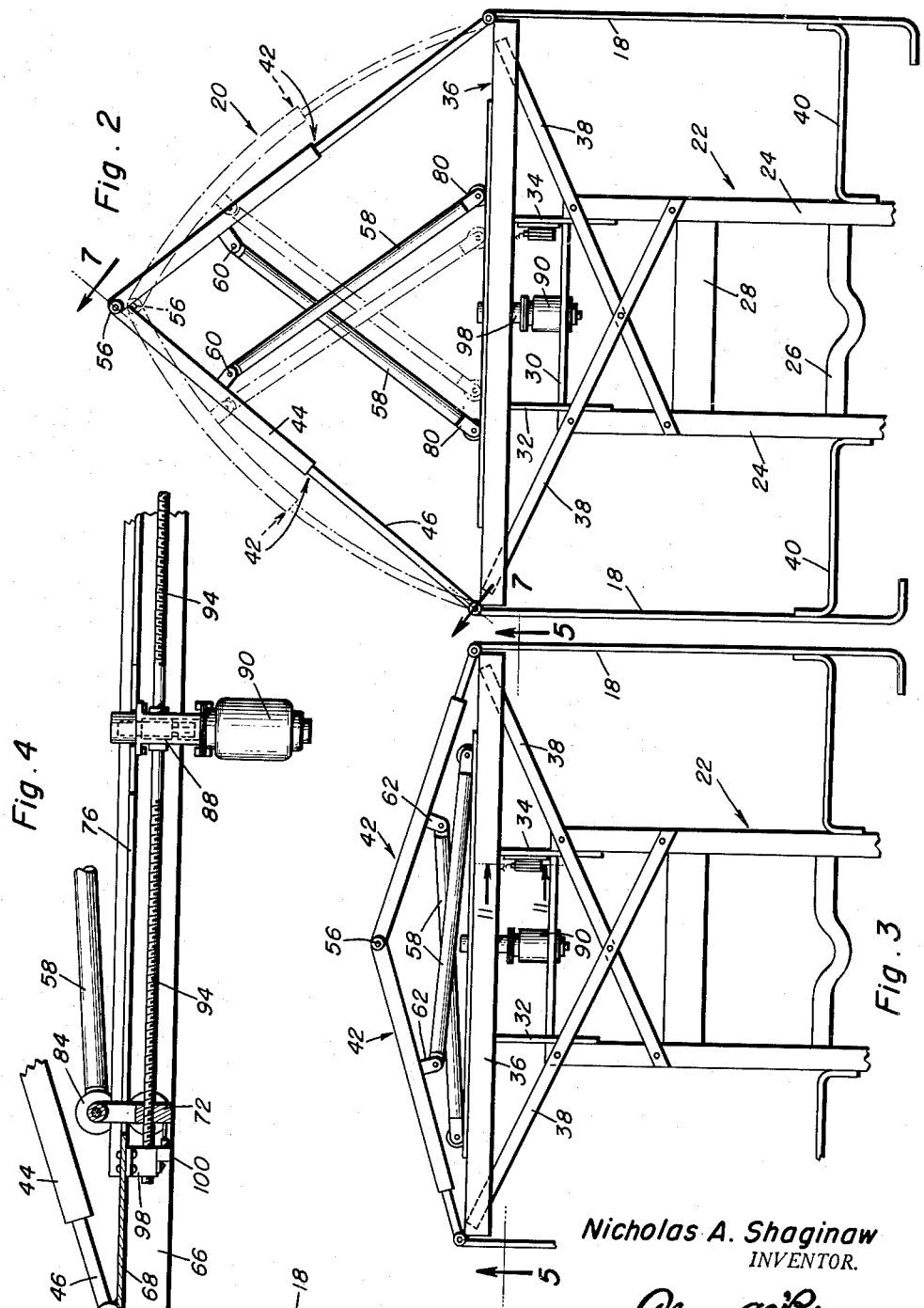

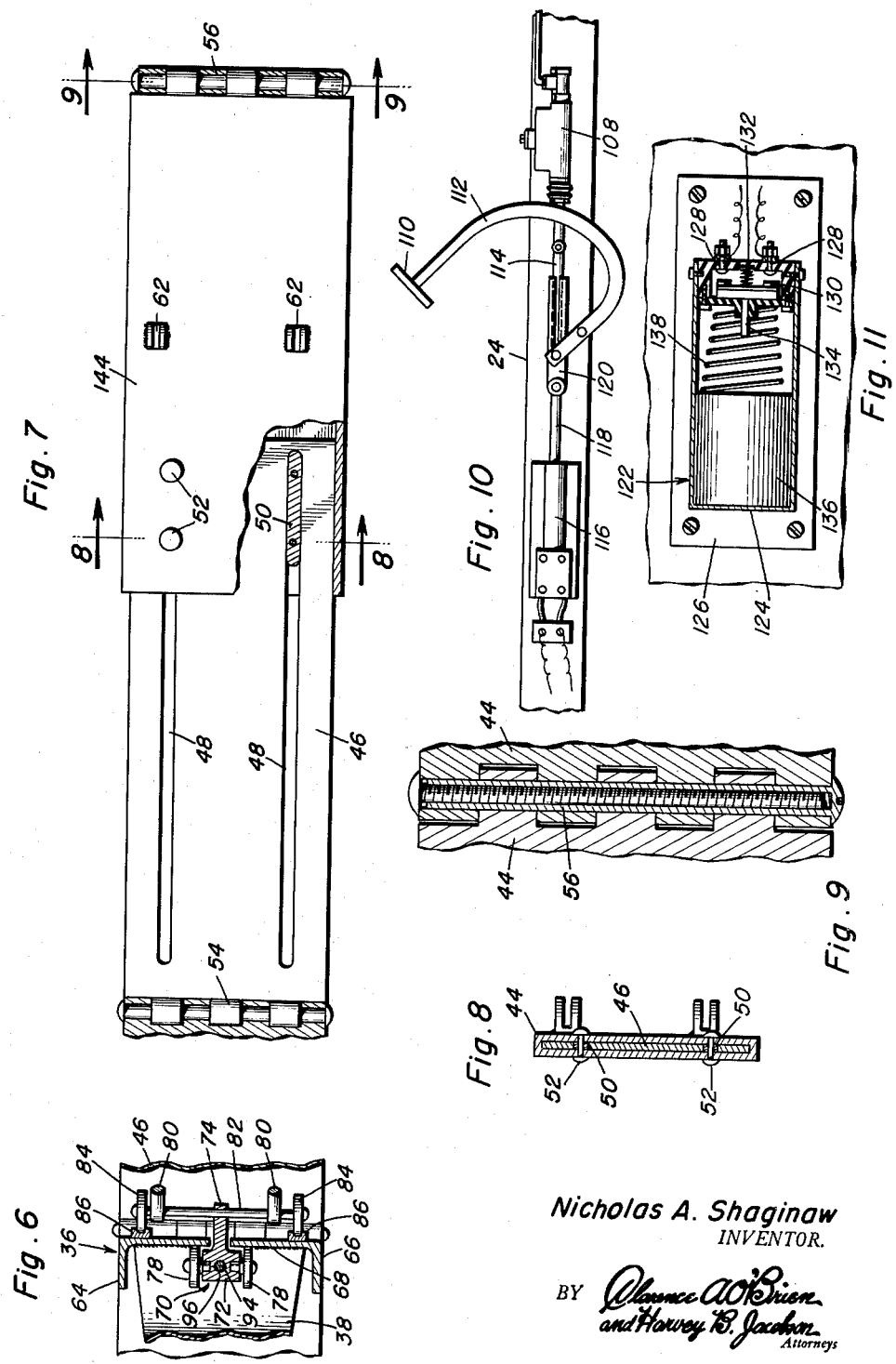

United States Patent Office 2,984,512
Patented May 16, 1961

2,984,512
AUTOMOBILE IMPACT DEFLECTING BUMPER AND BODY GUARD

Nicholas A. Shaginaw, 701 Grant St., Reynoldsville, Pa.

Filed Jan. 12, 1956, Ser. No. 558,656

10 Claims. (Cl. 293—73)

This invention relates in general to new and useful improvements in bumper construction for vehicles, and more specifically to an improved impact deflecting bumper for vehicles.

It is well known that if the front bumper of a vehicle is generally in triangular in outline so as to reduce the maximum direct frontal area thereof, when two vehicles hit on a headon collision the vehicles are deflected away from each other thereby greatly lessening the impact between the two. However, such a bumper arrangement is not practical in modern cars particularly because of the relatively greater amount of space which the bumper would require. It is therefore the primary object of this invention to provide an improved impact deflecting bumper which is of the general triangular outline and which normally projects forwardly of the vehicle and at the same time is selectively retractible whereby it assumes a minimum of space at the front of the vehicle and renders the vehicle suitable for city and traffic driving as well as parking and the like.

Still another object of this invention is to provide an improved impact deflecting bumper which is of the collapsible type and which is provided with means for selectively collapsing or expanding the same by the operator of the vehicle while positioned within the vehicle.

Still another object of the invention is to provide an improved impact deflecting bumper which is of a generally V-shape outline and which is formed of bumper members which are selectively expandible, the bumper members being formed of flexible material whereby they may be bowed in an expanded position so as to provide a curved or rounded deflecting surface.

A further object of this invention is to provide an improved safety construction for a vehicle which includes an impact deflecting bumper and means for automatically actuating the brakes of a vehicle, the means including an inertia actuated device responsive to the sudden deceleration of the vehicle to actuate the brakes thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of an automobile employing the impact deflecting bumper and body guard which are the subject of this invention, the impact deflecting bumper being illustrated in its projecting position;

Figure 2 is a top plan view of the impact deflecting bumper on an enlarged scale and showing the same attached to the frame of the vehicle, the bumper being shown in extended position by solid lines and in a bowed position by broken lines;

Figure 3 is an enlarged fragmentary plan view similar to Figure 2 and shows the bumper in a retracted position;

Figure 4 is an enlarged fragmentary horizontal sectional view taken through the rear portion of the bumper and shows the arrangement of means for selectively expanding and retracting the bumper;

Figure 5 is an enlarged transverse vertical sectional view taken substantially upon the plane indicated by the section line 5—5 of Figure 4 and shows further the details of the means for selectively expanding and retracting the bumper;

Figure 6 is an enlarged fragmentary sectional view taken substantially upon the plane indicated by the section line 6—6 of Figure 5 and shows the specific details of guide means for restraining movement of one of the braces for retaining the bumper in an expanded position;

Figure 7 is an enlarged sectional view taken substantially upon the plane indicated by the section line 7—7 of Figure 2 and shows the specific details of one of the bumper members;

Figure 8 is an enlarged fragmentary vertical sectional view taken substantially upon the plane indicated by the section line 8—8 of Figure 7 and shows the details of construction of one bumper member;

Figure 9 is an enlarged fragmentary sectional view taken substantially upon the plane indicated by the section line 9—9 of Figure 7 and shows the pivotal connection between the forward ends of the bumper members;

Figure 10 is an enlarged fragmentary side elevational view of the frame rails of the frame of the vehicle and shows the mounting a master brake cylinder thereon the means for automatically actuating the master brake cylinder upon the sudden deceleration of the vehicle;

Figure 11 is an enlarged fragmentary vertical sectional view taken substantially upon the plane indicated by the section line 11—11 of Figure 3 and shows the specific details of the inertia actuated switch for controlling the actuator for the master brake cylinder; and Figure 12 is a wiring diagram for the motor which effects the extension and retraction of the bumper.

Referring now to the drawings in detail, it will be seen that there is illustrated in Figure 1 a conventional type of automobile which is referred to in general by the reference numeral 10. For the purpose of the present invention the automobile 10 may be of any design. The body of the automobile 10 is protected by a rear body guard 12, a rear door body guard 14, a front door body guard 16 and a front fender body guard 18. The body guards 12, 14, 16 and 18 are suitably secured to the frame of the vehicle 10 in order to take any crash impacts which would normally be absorbed by the body of the vehicle 10. Disposed at the front of the vehicle 10 is the impact deflecting bumper which is the primary feature of the present invention, the bumper being referred to in general by the reference numeral 20.

Referring now to Figure 2 in particular, it will be seen that the vehicle 10 includes a frame which is referred to in general by the reference numeral 22. The frame 22 is of a conventional construction and includes a pair of longitudinal frame members 24 which are connected together by suitable bracing 26, 28 and a front cross frame member 30. Extending forwardly from the forward end of the frame rails 24 are mounting brackets 32 and 34. The forward ends of the mounting brackets 32 and 34 are connected to a transverse frame member or track 36, the track 36 being channel shaped in cross section, as is best illustrated in Figure 6. The outer ends of the track 36 are braced by suitable diagonal braces 38.

The front fender guards 18 are supported adjacent their rear ends by suitable braces 40 which extend inwardly and are connected to the frame rails 24. The forward ends of the front fender guards 18 are connected to the opposite ends of the track 36.

Pivotally connected to the opposite ends of the track 36 is a pair of bumper members 42. The bumper members 42 each include a forward section 44 and a rear section 46. As is best illustrated in Figures 7 and 8, the forward section 44 is hollow and is rectangular in cross section. The rear section 46 is of flat material and is of a cross section so as to be telescoped within the section 44. The section 46 is provided with a pair of longitudinal slots 48 which are vertically spaced. Positioned within the slots 48 are suitable guide bars 50 which are carried by the section 44, the guide bars 50 being secured to the section 44 by suitable fasteners 52. Thus the sections 44 and 46 are retained in alignment at all times irrespective of the amount which are telescoped together.

The sections 46 have their rear ends provided with suitable hinge structures 54 which permits the pivotal connection of the bumper members 42 to the track 36. A similar hinge 56 connects together the forward ends of the sections 44 to couple together the forward ends of the bumper members 42.

In view of the fact that the bumper members 42 are of adjustable length, it will be more readily apparent that the overall size of the bumper 20 may be increased and decreased as desired. However, only two main positions of the bumper 20 is desired; they are the expanded position of Figure 2 and the retracted position of Figure 3. In order that the bumper members 42 may be moved between expanded and retracted positions, there is provided a pair of braces 58 which are disposed in cross relation and which are pivotally connected to central portions of the sections 44 by means of pins 60 carried by vertically spaced ears 62 on the sections 44.

As is best illustrated in Figure 6, the track 36 is channel shaped in cross section and includes an upper flange 64, a lower flange 66 and a web 68. Engaged with the web 68 on opposite sides of the center line thereof are guides which are referred to in general by the reference numeral 70. Inasmuch as the guides 70 are identical, only one of the guides will be described in detail. Each guide 70 includes a support 72 having a forwardly extending reduced portion 74 which extends through a longitudinal slot 76 in the web 68. Carried by the support 72 is a pair of vertically spaced rollers 78 which engage the rear surface of the web 68. The rollers 78 limit the forward movement of the guides 70.

The rear ends of the braces 58 are provided with vertically spaced ears 80 which have received therethrough a vertical shaft 82. The shaft 82 passes through the extension 74 and pivotally connects the rear end of an associated brace 58 to the support 72. The upper and lower ends of the shaft 82 are provided with vertically spaced horizontally disposed rollers 84. The rollers 84 are positioned in channel shaped cross section auxiliary tracks 86 carried by the forward face of the web 68 in vertically spaced relation. The tracks 86 take the rear pressure from the braces 58 and at the same time vertically position the guides 70.

Carried by the central portion of the web 68 and mounted on the rear surface thereof is a gear box 88. Connected to the gear box 88 for driving the same is an electric motor 90. Extending outwardly from opposite sides of the gear box 88 are horizontally disposed shafts 92. The shafts 92 have the major portion thereof provided with external threads 94. Each of the supports 72 is provided with an internally threaded bore 96 in which the threaded portion 94 of its respective shaft 92 is threadedly engaged. The ends of the shafts 92 are mounted in suitable bearings 98 which are also carried by the web 68.

It will be readily apparent that when the electric motor 90 is energized, the shafts 92 will be rotated. Depending upon the direction of rotation of the shafts 92, the guides 70 will be moved towards each other or away from each other. When the guides 70 are moved towards each other from the positions of Figure 3, the braces 58 move to the solid line position of Figure 2. This results in the extension of the bumper members 42 and the projecting of the bumper 20. Further movement of the guides 70 towards each other from the solid line positions of Figure 2 will result in the outward bowing of the bumper members 42 inasmuch as they cannot elongate any further from the solid line positions of Figure 2.

Carried by one of the bearings 98 is a limit switch 100. A similar limit switch 102 is carried by the web 68 adjacent the gear box 88. The limit switches 100 and 102 are engaged by one of the supports 72 and deenergize the motor 90. The limit switches 100 and 102 are of the conventional type which only temporarily break the circuit and which permits the electric motor 90 to be energized after a short interval for reverse movement, if desired.

Referring now to the wiring diagram of Figure 12, it will be seen that the electric motor 90 is connected to the battery 104 of the automobile 10. In addition to the limit switches 100 and 102 there is provided a circuit reversing switch 106. The circuit reversing switch 106 is mounted within the vehicle 10 within the convenient reach of the operator thereof. By moving the circuit reversing switch 106 in one direction, the guides 70 may be moved apart and by moving the circuit reversing switch 106 in the opposite direction the guides 70 may be moved towards each other whereby the bumper 20 may be expanded and retracted by the operator of the vehicle 10 while within the vehicle 10.

By providing the vehicle 10 with the bumper 20, it will be readily apparent that due to the curved surfaces of the bumper 20 and the relatively small direct frontal area of such bumper, when two vehicles 10 employing bumpers 20 hit either on a headon collision or a near headon collision, the two vehicles will be deflected one away from the other so as to eliminate the normal impact resulting from headon collision. This reduction of impact will greatly reduce the damage done by the striking of the two automobiles.

Inasmuch as the bumper 20 is only required when the automobile 10 is operating at high speeds, the overall length of the automobile 10 may be reduced by collapsing or retracting the bumper 20 when the automobile 10 is driven in the city or other places of heavy traffic. Also, the collapsing of the bumper 20 permits the vehicle 10 to be conveniently parked in normal parking places.

Referring now to Figure 10 in particular, it will be seen that carried by one of the frame rails 24 is a master brake cylinder 108 of a brake system of the automobile 10. The master brake cylinder 108 is normally actuated by a brake pedal 110 carried by a brake lever 112. The lever 112 is connected to the master brake cylinder 108 by suitable linkage 114.

In order to automatically operate the master brake cylinder 110 without relying upon the brake pedal 110, there is provided an electromagnetic actuator 116. The actuator 116 includes a plunger 118 which is connected to a fitting 120. The fitting 120 is of the bifurcated type and permits the normal operation of the master brake cylinder 108 utilizing the brake pedal 110. However, when the electromagnetic actuating device 116 is energized, it will move the brake pedal 110, the lever 112 and the linkage 114 to automatically actuate the master brake cylinder 108.

Referring now to Figure 11 in particular, it will be seen that there is illustrated an inertia actuated control switch which is referred to in general by the reference numeral 122. The switch 122 includes a housing 124 carried by a suitable mounting plate 126. The switch 122 is mounted on the bracket 34, as is best illustrated in Figures 2 and 3.

Mounted at one end of the housing 124 is a pair of spaced, fixed contacts 128. The contacts 128 are selectively bridged by a movable contact 130 which is spring urged away from the contacts 128 by means of a coil spring 132. The contact 130 is provided with an actuating plunger 134 which extends into the main portion of the housing 124.

The housing 124 is longitudinally disposed and the contacts 128 are disposed at the forward end thereof.

Normally mounted in the rear portion of the housing 124 is a weight 136. The weight 136 is retained in the rear portion of the housing 124 by a coil spring 138.

It is to be understood that the switch 122 is electrically connected to both the electromagnetic actuator 116 and the battery 104 of the automobile 10. The electrical connection is such that when the contacts 128 are bridged the electromagnetic actuator 116 will be actuated to operate the master brake cylinder 108.

When the vehicle 10 strikes another car or some other object, the rapid deceleration of the vehicle due to such striking will cause the weight 136 to move forward in the housing 124. At the end of its forward movement the weight 136 will strike the plunger 134 and move the bridging contacts 134 to bridge the contacts 138. This will result in the energization of the electromagnetic actuator 116 and the setting of the brakes of the vehicle 10 by the master brake cylinder 108, the setting of the brakes being automatic.

It is pointed out at this time that while the impact deflecting type bumper, such as the bumper 20, prevents the direct headon collision between automobiles, it does result in the automobiles bouncing off of each other with a tendency towards going off the road on opposite sides thereof. Due to this deflecting movement of the automobiles the drivers are often times unbalanced with the result that they are unable to properly apply the brakes of the vehicle. By providing the automatic inertia controlled actuator for the brakes of the vehicle 10, it will be readily apparent that as soon as there is any impact due to the striking of one vehicle by another, the brakes of the vehicle automatically be set thus preventing further damage due to the accident.

Although the bumper assembly has been illustrated and described as being mounted on the front of the vehicle, the invention is not so limited. If desired, a similar bumper assembly may be mounted on the rear of the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An impact deflecting vehicle bumper comprising a support means fixedly secured to a vehicle and projecting forwardly thereof, a pair of forwardly convergent bumper members each including a pair of longitudinally extensible sections, the forward ends of the forward sections of said bumper members being pivoted together, the rear ends of the rear sections of said bumper members being secured to said support means at pivots spaced transversely thereof, a pair of brace rods each having a forward end pivoted to a bumper member intermediate the ends of the latter and having their rear ends mounted upon said support means for relative movement transversely thereof, actuating means connected to said brace rod rear ends for effecting relative movement of the latter towards and from each other whereby to apply force to said bumper members for selectively longitudinally extending and retracting the latter, said support means, bumper means and brace rods lying substantially in a common plane.

2. The combination of claim 1 whereby said bumper members are laterally flexible whereby said applied force will bow said bumper members between said ends to present a curved deflecting surface, cooperating stop means on each pair of front and rear sections to limit the maximum length of said bumper members.

3. An impact deflecting vehicle bumper comprising a support means fixedly secured to a vehicle and projecting forwardly thereof, a pair of forwardly convergent bumper members each including a pair of longitudinally extensible sections, the forward ends of the forward sections of said bumper members being pivoted together, the rear ends of the rear sections of said bumper members being secured to said support means at pivots spaced transversely thereof, a pair of brace rods each having a forward end pivoted to a bumper member intermediate the ends of the latter and having their rear ends mounted upon said support means for relative movement transversely thereof, actuating means connected to said brace rod rear ends for effecting relative movement of the latter towards and from each other whereby to apply force to said bumper members for selectively longitudinally extending and retracting the latter, said sections being telescoping.

4. The combination of claim 1 wherein said forward ends of said brace rods are pivoted to said front sections.

5. The combination of claim 1 including guide means carried by said support means and engaging and restraining for transverse movement only said brace rod rear ends.

6. The combination of claim 5 wherein said actuating means is mounted upon said support means and is connected to at least one of said brace rod rear ends.

7. The combination of claim 6 wherein said actuating means is connected to both of said brace rod rear ends.

8. The combination of claim 1 including guide means carried by said support means and engaging and restraining for transverse movement only said brace rod rear ends wherein said actuating means is connected to both of said brace rod rear ends.

9. An impact deflecting vehicle bumper comprising a support means fixedly secured to a vehicle and projecting forwardly thereof, a pair of forwardly convergent bumper members each including a pair of longitudinally extensible sections, the forward ends of the forward sections of said bumper members being pivoted together, the rear ends of the rear sections of said bumper members being secured to said support means at pivots spaced transversely thereof, a pair of brace rods each having a forward end pivoted to a bumper member intermediate the ends of the latter and having their rear ends mounted upon said support means for relative movement transversely thereof, actuating means connected to said brace rod rear ends for effecting relative movement of the latter towards and from each other whereby to apply force to said bumper members for selectively longitudinally extending and retracting the latter, guide means carried by said support means and engaging and restraining for transverse movement only said brace rod rear ends, said guide means includes a track, spaced supports each pivoted to one of said brace rod rear ends, rollers carried by said support and guidedly engaged with said track.

10. An impact deflecting vehicle bumper comprising a support means fixedly secured to a vehicle and projecting forwardly thereof, a pair of forwardly convergent bumper members each including a pair of longitudinally extensible sections, the forward ends of the forward sections of said bumper members being pivoted together, the rear ends of the rear sections of said bumper members being secured to said support means at pivots spaced transversely thereof, a pair of brace rods each having a forward end pivoted to a bumper member intermediate the ends of the latter and having their rear ends mounted upon said support means for relative movement transversely thereof, actuating means connected to said brace rod rear ends for effecting relative movement of the latter towards and from each other whereby to apply force to said bumper members for selectively longitudinally extending and retracting the latter, said actuating means comprising a drive unit mounted on said support means, means connecting said drive means to said brace rod rear ends, said connecting means comprising feed screws having a screw threaded connection to said rear ends.

References Cited in the file of this patent

UNITED STATES PATENTS

| | | |
|---|---|---|
| 1,407,881 | Nordnes | Feb. 28, 1922 |
| 1,646,055 | Ebaugh | Oct. 18, 1927 |
| 1,672,243 | Blake | June 5, 1928 |
| 1,783,875 | Ferdinand | Dec. 2, 1930 |
| 1,855,977 | Llobet | Apr. 26, 1932 |
| 2,170,981 | Walter | Aug. 29, 1939 |
| 2,232,726 | Perez | Feb. 25, 1941 |
| 2,274,440 | Tozier | Feb. 24, 1942 |
| 2,588,815 | Fasolino | Mar. 11, 1952 |
| 2,603,517 | Zitarosa | July 15, 1952 |
| 2,639,183 | Williams | May 19, 1953 |

FOREIGN PATENTS

| | | |
|---|---|---|
| 470,628 | Canada | Jan. 9, 1951 |